(12) United States Patent
Yabu et al.

(10) Patent No.: US 8,875,540 B2
(45) Date of Patent: Nov. 4, 2014

(54) HUMIDITY CONTROL APPARATUS

(75) Inventors: Tomohiro Yabu, Osaka (JP); Yasunobu Okumura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 931 days.

(21) Appl. No.: 12/746,395

(22) PCT Filed: Nov. 20, 2008

(86) PCT No.: PCT/JP2008/003411
§ 371 (c)(1),
(2), (4) Date: Jun. 4, 2010

(87) PCT Pub. No.: WO2009/072246
PCT Pub. Date: Jun. 11, 2009

(65) Prior Publication Data
US 2010/0251758 A1    Oct. 7, 2010

(30) Foreign Application Priority Data

Dec. 7, 2007   (JP) ................... 2007-316784

(51) Int. Cl.
F25B 15/00   (2006.01)
F24F 3/14    (2006.01)
F25B 13/00   (2006.01)

(52) U.S. Cl.
CPC ............. *F24F 3/1411* (2013.01); *F24F 3/1429* (2013.01); *F25B 13/00* (2013.01); *F25B 2313/02341* (2013.01); *F25B 2313/02344* (2013.01); *F25B 2313/02741* (2013.01); *F25B 2313/02742* (2013.01)
USPC ........................................................ 62/481

(58) Field of Classification Search
CPC ................... F24F 3/1411; F24F 3/1429; F25B 2313/02341; F25B 2313/02742; F25B 17/00
USPC ................. 62/186, 271, 481, 477, 94, 324.5; 700/278
See application file for complete search history.

(56) References Cited

U.S. PATENT DOCUMENTS

| 5,816,065 | A | 10/1998 | Maeda |
| 2002/0035849 | A1* | 3/2002 | Tanaka et al. ................... 62/480 |
| 2005/0150237 | A1* | 7/2005 | Yabu et al. ......................... 62/94 |
| 2006/0162367 | A1* | 7/2006 | Yabu et al. ....................... 62/271 |
| 2006/0218943 | A1* | 10/2006 | Yabu et al. ......................... 62/94 |
| 2007/0039343 | A1* | 2/2007 | Ikegami et al. .................. 62/271 |

(Continued)

FOREIGN PATENT DOCUMENTS

| CN | 1162092 A | 10/1997 |
| CN | 1773179 A | 5/2006 |
| CN | 101000163 A | 7/2007 |
| CN | 101076697 A | 11/2007 |
| CN | 2826245 Y | 10/2008 |

(Continued)

*Primary Examiner* — Frantz Jules
*Assistant Examiner* — Emmanuel Duke
(74) *Attorney, Agent, or Firm* — Birch, Stewart, Kolasch & Birch, LLP (57) ABSTRACT

A humidity control apparatus has a refrigerant circuit 20 that has a compressor 21 and a first adsorption heat exchanger 23 and a second adsorption heat exchanger 25, each of which has an adsorbent for adsorbing the moisture of air supported thereon, and that reversibly circulates refrigerant to perform a vapor compression refrigeration cycle. The refrigerant circuit 20 is provided with a sensible heat exchanger 26 in which the refrigerant after having passed through the adsorption heat exchanger 23, 25 functioning as an evaporator exchanges heat with the air having passed through the adsorption heat exchanger 23, 25 functioning as a condenser, thereby cooling the air.

5 Claims, 4 Drawing Sheets

(56) References Cited

U.S. PATENT DOCUMENTS

| | | | |
|---|---|---|---|
| 2007/0051123 A1* | 3/2007 | Matsui et al. | 62/324.5 |
| 2007/0180844 A1* | 8/2007 | Fujiyoshi et al. | 62/271 |
| 2007/0180851 A1* | 8/2007 | Fujiyoshi et al. | 62/480 |
| 2007/0193287 A1* | 8/2007 | Ishida et al. | 62/176.1 |
| 2007/0214810 A1* | 9/2007 | Yabu et al. | 62/93 |
| 2008/0093059 A1 | 4/2008 | Nishida | |

FOREIGN PATENT DOCUMENTS

| | | |
|---|---|---|
| JP | 2004-69257 A | 3/2004 |
| JP | 2005-114291 A | 4/2005 |
| JP | 2005-140372 A | 6/2005 |
| JP | 2005-164220 A | 6/2005 |
| JP | 2005-291572 A | 10/2005 |
| JP | 2006-78171 A | 3/2006 |
| JP | 2006-341217 A | 12/2006 |

* cited by examiner

FIG. 8

HUMIDITY CONTROL APPARATUS

TECHNICAL FIELD

The present invention relates to a humidity control apparatus for humidifying air by the use of a refrigerant circuit having an adsorption heat exchanger.

BACKGROUND ART

There has been known a humidity control apparatus for humidifying air by the use of a refrigerant circuit that has an adsorption heat exchanger and that performs a refrigeration cycle.

For example, a humidity control apparatus disclosed in a patent document 1 is provided with a refrigerant circuit having: a compressor; two adsorption heat exchangers (a first adsorption heat exchanger and a second adsorption heat exchanger); and an expansion valve connected to each other. The refrigerant circuit is constructed in such a way as to perform a vapor compression refrigeration cycle by reversibly circulating refrigerant. The adsorption heat exchanger has an adsorbent supported on its surface, the adsorbent adsorbing the moisture of air. By switching the direction of circulation of the refrigerant, the refrigerant circuit is switched between a state in which the first adsorption heat exchanger functions as a condenser and in which the second adsorption heat exchanger functions as an evaporator and a state in which the first adsorption heat exchanger functions as an evaporator and in which the second adsorption heat exchanger functions as a condenser.

In the adsorption heat exchanger functioning as the condenser, a regeneration operation in which moisture is desorbed from the absorbent is performed and the desorbed moisture is supplied to circulating air, whereby the air is humidified. Moreover, in the adsorption heat exchanger functioning as the evaporator, an adsorption operation in which the moisture of the circulating air is adsorbed by the adsorbent is performed, whereby the air is dehumidified. In this humidity control apparatus, a humidifying operation for supplying humidified air into a room and a dehumidifying operation for supplying dehumidified air into the room are switched.

CITATION LIST

Patent Document

PATENT DOCUMENT 1: Japanese Patent Publication No. 2006-78171

SUMMARY OF THE INVENTION

Technical Problem

Meanwhile, in the humidity control apparatus disclosed in the patent document 1, the refrigerant radiates heat in the adsorption heat exchanger functioning as the condenser, whereby the adsorbent is regenerated and the circulating air is heated to some extent. In other words, in the adsorption heat exchanger functioning as the condenser, the air is humidified and at the same time is heated. Thus, in the case of the humidifying operation, the room is humidified and at the same time is also warmed.

On the other hand, in recent years, in the winter, there have been increasing cases where a heating operation is performed in the morning but where the heating operation is switched to a cooling operation in the day time. When the humidifying operation is performed by the above-mentioned humidity control apparatus in a room cooled in this way by another air conditioner, the room is humidified but the cooling load of the room is increased. This presents a problem that the consumption energy of the air conditioner is increased more than required.

The present invention has been made in view of these points, and the object of the invention is to humidify a room without increasing the cooling load of an air conditioner in a humidity control apparatus that has a refrigerant circuit including an adsorption heat exchanger and that controls humidity of air.

Solution to the Problem

A first invention is predicated on a humidity control apparatus that has a refrigerant circuit 20 including a compressor 21, and a first adsorption heat exchanger 23 and a second adsorption heat exchanger 25, each of which has an adsorbent for adsorbing the moisture of air supported thereon, and circulating refrigerant to perform a vapor compression refrigeration cycle, and that reversibly switches a direction of circulation of the refrigerant of the refrigerant circuit 20 to alternately perform an adsorption operation and a regeneration operation of the adsorbent in the two adsorption heat exchangers 23, 25, thereby supplying air having passed through the adsorption heat exchanger 23, 25 into a room. The refrigerant circuit 20 includes a sensible heat exchanger 26 that makes the air having passed through the adsorption heat exchanger 23, 25 in which the regeneration operation of the adsorbent is performed exchange heat with the refrigerant having passed through the adsorption heat exchanger 23, 25 in which the adsorption operation of the adsorbent is performed, thereby cooling the air.

In the above-mentioned invention, the direction of circulation of the refrigerant of the refrigerant circuit 20 is switched, whereby the two operations are alternately performed. Specifically, a vapor compression refrigeration cycle in which the first adsorption heat exchanger 23 functions as a condenser (radiator) and in which the second adsorption heat exchanger 25 functions as an evaporator and a vapor compression refrigeration cycle in which the first adsorption heat exchanger 23 functions as an evaporator and in which the second adsorption heat exchanger 25 functions as a condenser (radiator) are alternately performed in the refrigerant circuit 20.

In the adsorption heat exchanger 23, 25 functioning as the evaporator, the adsorbent of the adsorption heat exchanger 23, 25 is cooled by the low-pressure refrigerant. When air passes through the adsorption heat exchanger 23, 25 in this state, the air is put into contact with the adsorbent of the adsorption heat exchanger 23, 25, whereby the moisture of the air is adsorbed by the adsorbent. In other words, the adsorption operation of the adsorbent is performed, whereby the air is dehumidified. On the other hand, in the adsorption heat exchanger 23, 25 functioning as the condenser (radiator), the adsorbent of the adsorption heat exchanger 23, 25 is heated by the high-pressure refrigerant. Then, the moisture is desorbed from the adsorbent and is supplied to the air. In other words, the regeneration operation of the adsorbent is performed, whereby the air is humidified. In this manner, the direction of circulation of the refrigerant is reversibly switched in the humidity control apparatus, whereby a state in which the adsorption operation is performed by the first adsorption heat exchanger 23 and in which the regeneration operation is performed by the second adsorption heat exchanger 25 and a state in which the regeneration operation is performed by the first adsorption heat exchanger 23 and in which the adsorption operation is performed by the second adsorption heat exchanger 25 are alternately switched. When the air having passed through the adsorption heat exchanger 23, 25 in which the regeneration operation is performed is supplied into the room, the room is humidified, whereas when the air having passed through the adsorption heat exchanger 23, 25 in which the adsorption operation is performed is supplied into the room, the room is dehumidified.

Meanwhile, the air humidified by the adsorption heat exchanger 23, 25 in which the regeneration operation is performed is heated by the high-pressure refrigerant. Thus, when the air having passed through the adsorption heat exchanger 23, 25 in which the regeneration operation is performed is supplied into the room as it is, the room is humidified and at the same time is warmed, that is, a heating and humidifying operation is performed. Here, there is a case where a room is cooled by an air conditioner even when it is winter. When the room like this is humidified by the humidity control apparatus, the cooling load of the air conditioner will be increased. As a result, the consumption energy of the air conditioner will be increased more than required.

Thus, in the humidity control apparatus of the present invention, the air having passed through the adsorption heat exchanger 23, 25 functioning as the condenser (radiator) is cooled by the sensible heat exchanger 26. In other words, the humidified air is cooled and is supplied into the room, that is, the so-called cooling and humidifying operation is performed. Therefore, as compared to a case where the humidified air is supplied into the room as it is, the temperature of the supplied air is lowered and hence the cooling load of the air conditioner can be reduced. Moreover, the refrigerant after having passed through the adsorption heat exchanger 23, 25 functioning as the evaporator flows through the sensible heat exchanger 26. In other words, the refrigerant after having evaporated in the adsorption heat exchanger 23, 25 flows to the sensible heat exchanger 26 and exchanges heat with the air. Thus, as compared to a case where the refrigerant before flowing to the adsorption heat exchanger 23, 25 functioning as the evaporator, that is, the refrigerant after having passed through the adsorption heat exchanger 23, 25 functioning as the condenser flows to the sensible heat exchanger 26 and evaporates, the amount of cooling of the air (amount of heat adsorbed from the air) in the sensible heat exchanger 26 is not so high. Thus, the air is not cooled so much in the sensible heat exchanger 26, so there is not a possibility that moisture contained in the air will condense and that the air will be dehumidified.

A second invention is the humidity control apparatus of the above-mentioned first invention, wherein the refrigerant circuit 20 is constructed in such a way that a cooling temperature of the air by the sensible heat exchanger 26 becomes a dew point temperature of the air or higher.

In the above-mentioned invention, the humidity control apparatus is controlled in such a way that the air humidified by the adsorption heat exchanger 23, 25 is not cooled to the dew point temperature or lower in the sensible heat exchanger 26. In this way, it is possible to reliably prevent the moisture contained in the air from being condensed in the sensible heat exchanger 26.

A third invention is the humidity control apparatus of the above-mentioned first or second invention, wherein the refrigerant circuit 20 includes a passage switching member 27 for switching a refrigerant passage in such a way that the sensible heat exchanger 26 switches between a state where the refrigerant having passed through the adsorption heat exchanger 23, 25 in which the adsorption operation of the adsorbent is performed flows to the sensible heat exchanger 26 and adsorbs heat from the air having passed through the adsorption heat exchanger 23, 25 in which the regeneration operation of the adsorbent is performed and a state where the refrigerant discharged from the compressor 21 flows to the sensible heat exchanger 26 and radiates heat to the air having passed through the adsorption heat exchanger 23, 25 in which the regeneration operation of the adsorbent is performed.

In the above-mentioned invention, two operations of the so-called heating and humidifying operation and the so-called cooling and humidifying operation can be switched by switching the passage switching member 27. Specifically, in the case of the cooling and humidifying operation, in the refrigerant circuit 20, the refrigerant discharged from the compressor 21 flows through the adsorption heat exchanger 23, 25 functioning as the condenser and the adsorption heat exchanger 23, 25 functioning as the evaporator in order and then flows to the sensible heat exchanger 26. In this case, the air having passed through the adsorption heat exchanger 23, 25 functioning as the condenser flows to the sensible heat exchanger 26 and is cooled and then is supplied into the room. In other words, in this case, the sensible heat exchanger 26 functions as a cooling heat exchanger. On the other hand, in the case of the heating and humidifying operation, in the refrigerant circuit 20, the refrigerant discharged from the compressor 21 flows to the sensible heat exchanger 26 and then flows to the adsorption heat exchanger 23, 25 functioning as the condenser and the adsorption heat exchanger 23, 25 functioning as the evaporator in order. In this case, the air having passed through the adsorption heat exchanger 23, 25 functioning as the condenser flows to the sensible heat exchanger 26 and is heated and then is supplied into the room. In other words, in this case, the sensible heat exchanger 26 functions as a heating heat exchanger.

Advantages of the Invention

As described above, according to the present invention, the refrigerant circuit 20 is provided with the sensible heat exchanger 26 that makes the air having passed through the adsorption heat exchanger 23, 25 functioning as the condenser exchange heat with the refrigerant having passed through the adsorption heat exchanger 23, 25 functioning as the evaporator, thereby cooling the air. Thus, the humidified air can be cooled and supplied into the room cooled by the air conditioner, that is, a cooling and humidifying operation can be performed. In this way, it is possible to reduce the cooling load of the air conditioner. As a result, it is possible to humidify the room and at the same time to reduce the consumption energy of the air conditioner.

Further, according to the second invention, the refrigerant circuit 20 is constructed in such a way that the cooling temperature of the air by the sensible heat exchanger 26 becomes the dew point temperature of the air or higher. For this reason, it is possible to avoid a state where the moisture of the air condenses and at the same time to cool the air in the sensible heat exchanger 26. In other words, it is possible to suitably cool the humidified air without dehumidifying the air. In this way, it is possible to reduce the cooling load of the air conditioner without reducing a humidifying capacity.

Still further, according to the third invention, the refrigerant circuit 20 is provided with the passage switching member 27 for switching the refrigerant passage between the state in which the refrigerant flows from the adsorption heat exchanger 23, 25 functioning as the evaporator to the sensible heat exchanger 26 and the state in which the refrigerant flows from the compressor 21 to the sensible heat exchanger 26. In this way, it is possible to switch the sensible heat exchanger 26 between a state in which the sensible heat exchanger 26 is made to function as a cooling heat exchanger and a state in which the sensible heat exchanger 26 is made to function as a heating heat exchanger. Thus, it is possible to provide the humidity control apparatus 10 that can switch between the cooling and humidifying operation for cooling the humidified air and for supplying the air into the room and the heating and humidifying operation for heating the humidified air and for supplying the air into the room.

DESCRIPTION OF EMBODIMENTS

Hereinafter, embodiments of the present invention will be described in detail on the basis of the drawings. Meanwhile, the following embodiments are essentially preferable exemplifications, and it is not intended to limit the scopes of the present invention, the applications of the invention, and the use of the invention by the embodiments.

<Embodiment 1>

A humidity control apparatus 10 of the present embodiment 1 controls humidity in a room and ventilates the room. In other words, this humidity control apparatus 10 controls the humidity of taken-in outdoor air OA and supplies the outdoor air into the room and at the same time discharges taken-in room air RA to the outside of the room.

Figure 1:
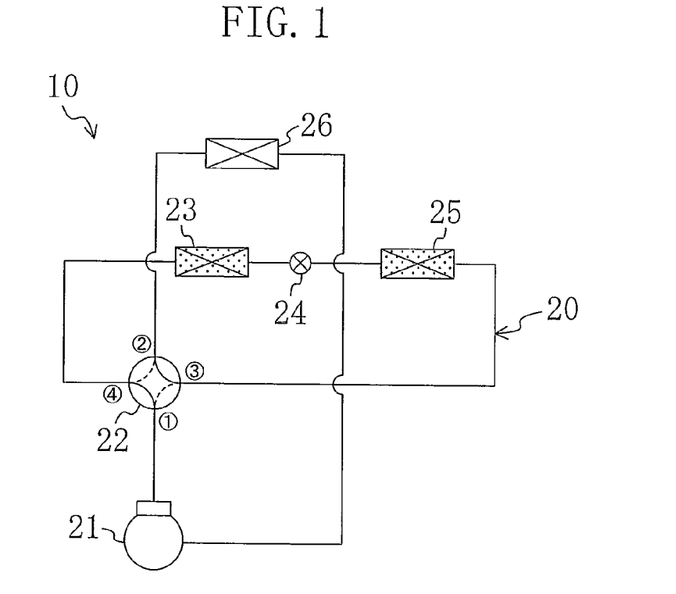
FIG. 1 is a piping system diagram to show the construction of a humidity control apparatus according to an embodiment 1.

Specifically, the humidity control apparatus 10 has a refrigerant circuit 20 in which refrigerant circulates to perform a vapor-compression refrigeration cycle, as shown in FIG. 1. The refrigerant circuit 20 is provided with a compressor 21, a four-way switching valve 22, a first adsorption heat exchanger 23, a second adsorption heat exchanger 25, and an electric expansion valve 24.

In the refrigerant circuit 20, the compressor 21 has a discharge side connected to a first port of the four-way switching valve 22 and has a suction side connected to a second port of the four-way switching valve 22. Moreover, in the refrigerant circuit 20, the first adsorption heat exchanger 23 has one end connected to a fourth port of the four-way switching valve 22 and has the other end connected to one end of the second adsorption heat exchanger 25 via the electric expansion valve 24. The other end of the second adsorption heat exchanger 25 is connected to a third port of the four-way switching valve 22. In other words, the first adsorption heat exchanger 23, the electric expansion valve 24, and the second adsorption heat exchanger 25 are connected to each other in order from the fourth port of the four-way switching valve 22 to the third port thereof.

Each of the adsorption heat exchangers 23, 25, although not shown in the drawing, is constructed of a fin-and-tube heat exchanger of a cross fin type and is provided with many fins formed in rectangular plates and heat-transfer pipes penetrating these fins. The fins and the heat-transfer pipes of the adsorption heat exchangers 23, 25 have an adsorbent supported on their outer surfaces. In other words, the adsorption heat exchangers 23, 25 are heat exchangers having the adsorbent supported on their surfaces and are constructed in such a way that the adsorbent adsorbs or desorbs moisture to thereby dehumidify or humidify circulating air. In this respect, the adsorption heat exchangers 23, 25 are not limited to the fin-and-tube heat exchangers of the cross-fin type but may be heat exchangers of other types, for example, heat exchangers of a corrugated fin type or the like.

The four-way switching valve 22 can switch between a first state (state shown by solid lines in FIG. 1), in which the first port connects to the fourth port and in which the second port connects to the third port, and a second state (state shown by broken lines in FIG. 1), in which the first port connects to the third port and in which the second port connects to the fourth port. When the refrigerant circuit 20 has the four-way switching valve 22 set in the first state, the refrigerant circuit 20 performs a refrigeration cycle in which the first adsorption heat exchanger 23 functions as a condenser (radiator) and in which the second adsorption heat exchanger 25 functions as an evaporator. Moreover, when the refrigerant circuit 20 has the four-way switching valve 22 set in the second state in, the refrigerant circuit 20 performs a refrigeration cycle in which the second adsorption heat exchanger 25 functions as a condenser (radiator) and in which the first adsorption heat exchanger 23 functions as an evaporator. In other words, the four-way switching valve 22 is a valve to reversibly switch the direction of circulation of the refrigerant in the refrigerant circuit 20.

In the adsorption heat exchanger 23, 25 functioning as the evaporator, an adsorption operation in which the moisture of air is adsorbed by the adsorbent is performed, whereby the air is dehumidified. In the adsorption heat exchanger 23, 25 functioning as the condenser (radiator), a regeneration operation in which moisture is desorbed from the adsorbent is performed. The desorbed moisture is supplied to air, whereby the air is humidified.

In addition, the refrigerant circuit 20 is provided with a sensible heat exchanger 26, which is a feature of the present invention. The sensible heat exchanger 26 is connected between the suction side of the compressor 21 and the second port of the four-way switching valve 22. In other words, the refrigerant after passing through the adsorption heat exchanger 23, 25 functioning as the evaporator always flows through the sensible heat exchanger 26. The sensible heat exchanger 26 constructs a cooling heat exchanger that exchanges heat between air after passing through the adsorption heat exchanger 23, 25 functioning as the condenser and the refrigerant to thereby cool the air.

In this regard, although not shown in the drawing, the humidity control apparatus 10 of the present embodiment is provided with an air passage, which passes taken-in outdoor air OA through the respective adsorption heat exchangers 23, 25 and the sensible heat exchanger 26 to supply the air into the room, and an air passage, which passes taken-in room air RA through the respective adsorption heat exchangers 23, 25 to discharge the air to the outside of the room.

—Driving Operation—

Next, a driving operation of the humidity control apparatus 10 will be described. This humidity control apparatus 10 is constructed so as to switch between a cooling and humidifying operation and a cooling and dehumidifying operation.

(Cooling and Humidifying Operation)

Figure 2:
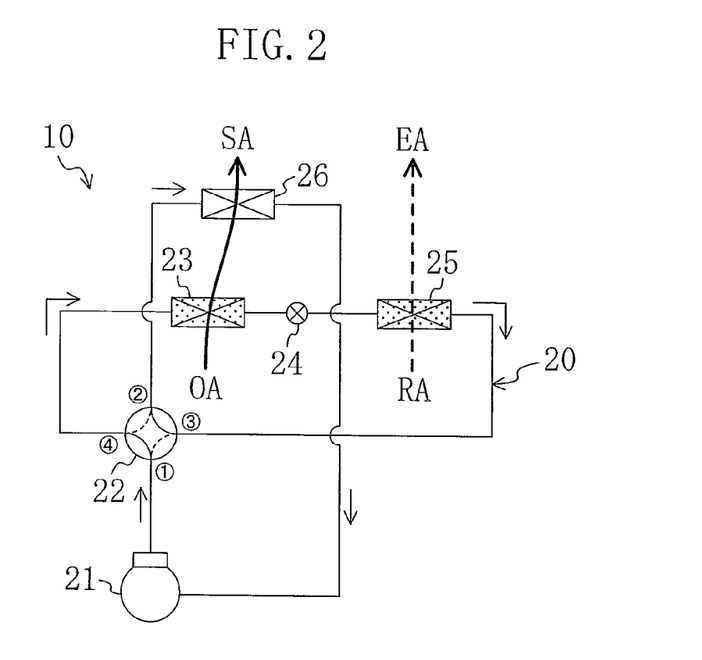
FIG. 2 is a piping system diagram to show a first operation of a cooling and humidifying operation according to the embodiment 1.
Figure 3:
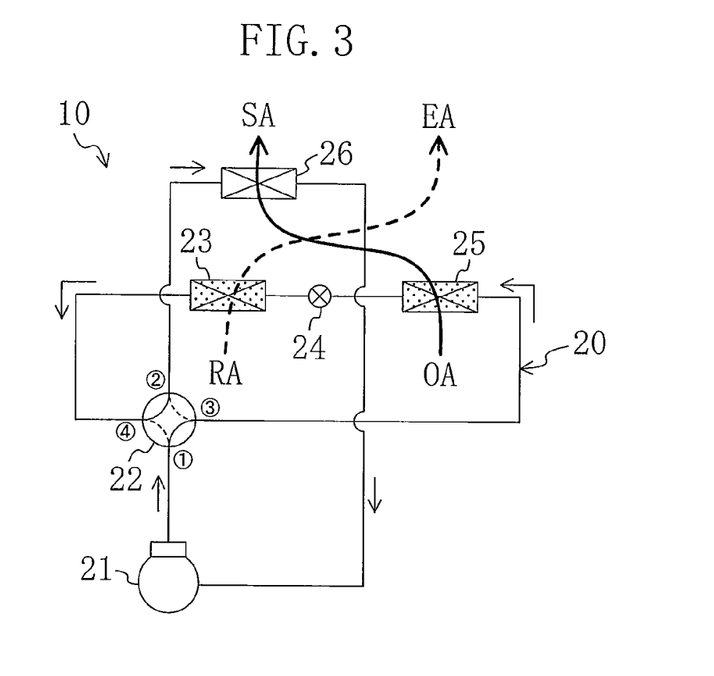
FIG. 3 is a piping system diagram to show a second operation of the cooling and humidifying operation according to the embodiment 1.

This cooling and humidifying operation is performed, for example, in the winter to a room in which a cooling operation is performed by another air conditioner. This operation is an operation in which a first operation and a second operation are alternately performed by switching the four-way switching valve 22 to supply air humidified by the adsorption heat exchanger 23, 25 into the room, as shown in FIG. 2 and FIG. 3. Here, in the refrigerant circuit 20, the refrigerant is circulated as shown in FIG. 4, whereby a refrigeration cycle is performed.

First, in the first operation, as shown in FIG. 2, the four-way switching valve 22 is set to the first state and the opening of the electric expansion valve 24 is suitably regulated. Moreover, in this first operation, an air passage is set in such a way that the outdoor air OA passes through the first adsorption heat exchanger 23 and the sensible heat exchanger 26 in order and is supplied into the room and in such a way that the room air RA passes through the second adsorption heat exchanger 25 and is discharged to the outside of the room. In other words, the outdoor air OA is taken in as air for regeneration and the room air RA is taken in as air for adsorption, respectively.

Figure 4:
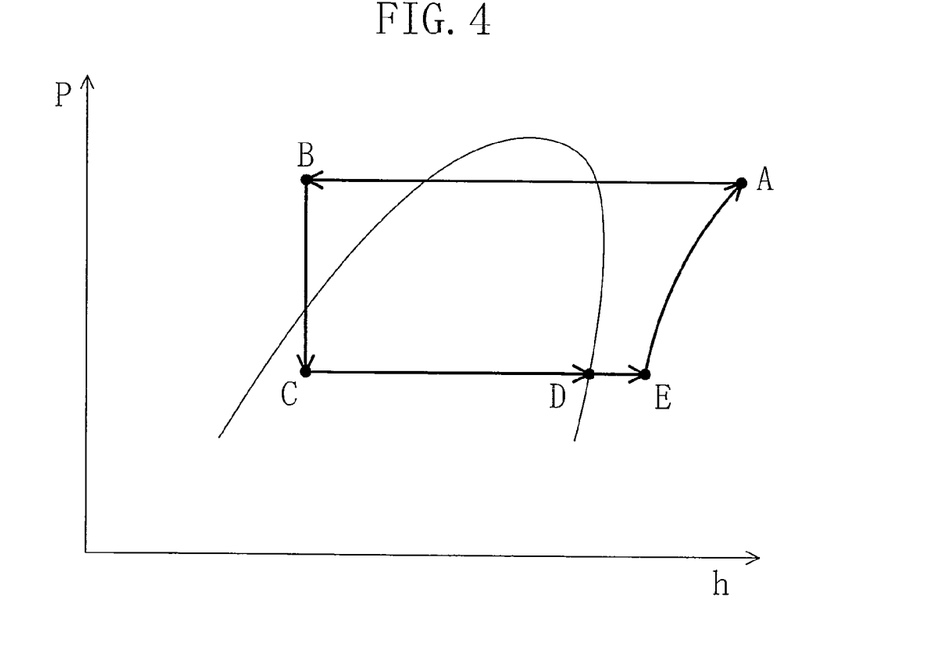
FIG. 4 is a Mollier diagram to show a refrigerant state of the cooling and humidifying operation according to the embodiment 1.

In this state, the refrigerant is compressed and discharged by the compressor 21 (point A in FIG. 4). The discharged refrigerant flows to the first adsorption heat exchanger 23 and radiates heat and condenses (point B in FIG. 4). By this heat radiation of the refrigerant, the adsorbent is regenerated in the first adsorption heat exchanger 23. In other words, moisture desorbed from the adsorbent is supplied to the outdoor air OA, whereby the outdoor air OA is humidified. Then, the outdoor air OA flows to the sensible heat exchanger 26.

The refrigerant having passed through the first adsorption heat exchanger 23 has pressure reduced by the electric expansion valve 24 and then flows to the second adsorption heat exchanger 25 (point C in FIG. 4). In the second adsorption heat exchanger 25, the refrigerant adsorbs heat from the room air RA and evaporates, whereas the moisture of the room air RA is adsorbed by the adsorbent, whereby the room air RA is dehumidified (point D in FIG. 4). The dehumidified room air RA is discharged to the outside of the room.

Then, the refrigerant having passed though the second adsorption heat exchanger 25 flows to the sensible heat exchanger 26. In the sensible heat exchanger 26, the refrigerant adsorbs heat from the outdoor air OA after having passed through the first adsorption heat exchanger 23, thereby being superheated (point E in FIG. 4). In this way, the outdoor air OA is cooled and then is supplied into the room, whereas the refrigerant superheated by the sensible heat exchanger 26 is again compressed and discharged by the compressor 21. This circulation of the refrigerant is repeatedly performed.

Next, the second operation will be described. When the above-mentioned first operation is performed for a specified time, the four-way switching valve 22 is set to the second state, whereby the first operation is switched to the second operation. In the second operation, as shown in FIG. 3, an air passage is set in such a way that the outdoor air OA passes through the second adsorption heat exchanger 25 and the sensible heat exchanger 26 in order and then is supplied into the room and that the room air RA passes through the first adsorption heat exchanger 23 and then is discharged to the outside of the room.

In this state, the refrigerant discharged from the compressor 21 flows to the second adsorption heat exchanger 25 (point A in FIG. 4). In the second adsorption heat exchanger 25, the refrigerant radiates heat and condenses (point B in FIG. 4). By this heat radiation of the refrigerant, the adsorbent is regenerated in the second adsorption heat exchanger 25 and moisture desorbed from the adsorbent is supplied to the outdoor air OA, whereby the outdoor air OA is humidified. Then, the outdoor air OA flows to the sensible heat exchanger 26.

The refrigerant having passed through the second adsorption heat exchanger 25 has pressure reduced by the electric expansion valve 24 and then flows to the first adsorption heat exchanger 23 (point C in FIG. 4). In the first adsorption heat exchanger 23, the refrigerant adsorbs heat from the room air RA and evaporates, whereas the moisture of the room air RA is adsorbed by the adsorbent, whereby the room air RA is dehumidified (point D in FIG. 4). The dehumidified room air RA is discharged to the outside of the room.

The refrigerant having passed through the first adsorption heat exchanger 23 flows to the sensible heat exchanger 26. In the sensible adsorption heat exchanger 26, the refrigerant adsorbs heat from the outdoor air OA after having passed through the second adsorption heat exchanger 25 and is superheated (point E in FIG. 4). In this way, the outdoor air OA is cooled and then is supplied into the room, whereas the refrigerant superheated by the sensible heat exchanger 26 is again compressed and discharged by the compressor 21. This circulation of the refrigerant is repeatedly performed.

In this manner, in the cooling and humidifying operation, the outdoor air OA humidified by the first adsorption heat exchanger 23 or the second adsorption heat exchanger 25 is cooled by the sensible heat exchanger 26 and then is supplied into the room. Here, the refrigerant circuit 20 is constructed in such a way that, in the sensible heat exchanger 26, the cooling temperature of the outdoor air OA becomes the dew point temperature of the air or higher, in other words, becomes not lower than the dew point temperature of the air. Specifically, as the position of the point D in the Mollier diagram shown in FIG. 4 moves further to the left, the amount of adsorption of heat of the refrigerant increases further in the sensible heat exchanger 26. Then, the cooling temperature of the outdoor air OA becomes lower and hence tends to become the dew point temperature of the outdoor air OA or lower. On the contrary, as the position of the point D in FIG. 4 moves further to the right, the amount of adsorption of heat of the refrigerant decreases further in the sensible heat exchanger 26. Then, the cooling temperature of the outdoor air OA becomes higher. Hence, by regulating the position of the point D in FIG. 4, the outdoor air OA is cooled in such a way that the cooling temperature of the outdoor air OA does not become its dew point temperature or lower in the sensible heat exchanger 26.

(Cooling and Dehumidifying Operation)

This cooling and dehumidifying operation is performed, for example, in summer to a room in which a cooling operation is performed by another air conditioner. This operation, although not shown in the drawing, is different in the passages of the outdoor air OA and the room air RA from the above-mentioned cooling and humidifying operation. In other words, in this cooling and dehumidifying operation, the outdoor air OA dehumidified by the adsorption heat exchanger 23, 25 is cooled by the sensible heat exchanger 26 and is supplied into the room and the room air RA humidified by the adsorption heat exchanger 23, 25 is discharged to the outside of the room, which is different from the above-mentioned cooling and humidifying operation.

Specifically, in the first operation, an air passage is set in such a way that the outdoor air OA passes through the second adsorption heat exchanger 25 and the sensible heat exchanger 26 in order and is supplied into the room and that the room air RA passes through the first adsorption heat exchanger 23 and is discharged to the outside of the room. In other words, the outdoor air OA is taken in as air for adsorption and the room air RA is taken in as air for regeneration, respectively. Moreover, in the second operation, the air passage is set in such a way that the outdoor air OA passes through the first adsorption heat exchanger 23 and the sensible heat exchanger 26 in order and is supplied into the room and that the room air RA passes through the second adsorption heat exchanger 25 and is discharged to the outside of the room.

—Advantages of the Embodiment 1—

According to the present embodiment 1, the refrigerant circuit 20 is provided the sensible heat exchanger 26 that is arranged between the adsorption heat exchanger 23, 25 functioning as the evaporator and the suction side of the compressor 21 and that cools the air humidified by the adsorption heat exchanger 23, 25. Thus, it is possible to cool the humidified air and to supply the air into the room. In this way, when a room cooled by another air conditioner is humidified, for example, in the winter, low-temperature humidified air can be supplied into the room, so it is possible to prevent the cooling load of the air conditioner from increasing. As a result, it is possible to reduce the consumption energy of the air conditioner and at the same time to humidify the room.

Further, in the present embodiment, the humidity control apparatus 10 is constructed in such a way that the cooling temperature of the air does not become the dew point temperature of the air or lower in the sensible heat exchanger 26. Thus, it is possible to cool the air without causing condensation. This makes it possible to perform the cooling and humidifying operation without reducing the humidifying capacity of the humidity control apparatus 10.

In particular, the sensible heat exchanger 26 is arranged between the adsorption heat exchanger 23, 25 functioning as the evaporator and the suction side of the compressor 21, so that the cooling capacity of the sensible heat exchanger 26 can be suitably reduced. In other words, the refrigerant evaporated in the adsorption heat exchanger 23, 25 flows through the sensible heat exchanger 26, so that the amount of adsorption of heat of the refrigerant (that is, the amount of cooling of air) can be comparatively reduced. In this way, it is possible to reliably make the cooling temperature of the air not lower than the dew point temperature of the air in the sensible heat exchanger 26.

Further, in the adsorption heat exchanger 23, 25 functioning as the condenser, the air is humidified and is heated in some degree. Then, the humidified and heated air flows to the sensible heat exchanger 26, so that the evaporation temperature (evaporation pressure) of the refrigerant in the sensible heat exchanger 26 becomes comparatively high. In this way, it is possible to reduce an input to the compressor 21. As a result, it is possible to improve the coefficient of performance (COP) of the refrigeration cycle.

Still further, in the present embodiment, the cooling and dehumidifying operation of cooling the dehumidified air and supplying the air into the room is performed, so when a room cooled by another air conditioner is dehumidified, for example, in the summer, it is possible to reduce the cooling load of the air conditioner. As a result, it is possible to reduce the consumption energy of the air conditioner and at the same time to dehumidify the room.

<Embodiment 2>

An embodiment 2 of the present invention will be described. A humidity control apparatus 10 of the present embodiment 2 has one four-way switching valve 27 added to the refrigerant circuit 20 of the above-mentioned embodiment 1, as shown in FIG. 5 to FIG. 8. In other words, the humidity control apparatus 10 of the present embodiment can perform a heating and humidifying operation in addition to the cooling and humidifying operation and the cooling and dehumidifying operation. Here, points in which the present embodiment 2 is different from the embodiment 1 will be described.

Specifically, the refrigerant circuit 20 of the present embodiment is provided with a first four-way switching valve 22 and a second four-way switching valve 27. In the refrigerant circuit 20, the compressor 21 has a discharge side connected to a first port of the second four-way switching valve 27 and has a suction side connected to a second port of the second four-way switching valve 27. A third port of the second four-way switching valve 27 is connected to a second port of the first four-way switching valve 22 via a sensible heat exchanger 26. A fourth port of the second switching valve 27 is connected to a first port of the first four-way switching valve 22. Moreover, a first adsorption heat exchanger 23 has one end connected to a fourth port of the first four-way switching valve 22 and has the other end connected to one end of a second adsorption heat exchanger 25 via an electric expansion valve 24. The other end of the second adsorption heat exchanger 25 is connected to a third port of the first four-way switching valve 22. In other words, the first adsorption heat exchanger 23, the electric expansion valve 24, and the second adsorption heat exchanger 25 are connected to each other in order from the fourth port of the first four-way switching valve 22 to the third port thereof.

The first four-way switching valve 22 of the present embodiment corresponds to the four-way switching valve 22 of the above-mentioned embodiment 1. The first four-way switching valve 22 can switch between a first state (state shown in FIG. 5 or FIG. 7), in which the first port connects to the fourth port and the second port connects to the third port, and a second state (state shown in FIG. 6 or FIG. 8), in which the first port connects to the third port and the second port connects to the fourth port. By switching this first four-way switching valve 22, the refrigerant circuit 20 is switched between a state, in which the first adsorption heat exchanger 23 functions as a condenser and the second adsorption heat exchanger 25 functions as an evaporator, and a state, in which the second adsorption heat exchanger 23 functions as a condenser and the first adsorption heat exchanger 23 functions as an evaporator.

On the other hand, the second four-way switching valve 27 can switch between a first state (state shown in FIG. 7 or FIG. 8), in which the first port connects to the fourth port and the second port connects to the third port, and a second state (state shown in FIG. 5 or FIG. 6), in which the first port connects to the third port and the second port connects to the fourth port. When the second four-way switching valve 27 is in the first state in the refrigerant circuit 20, the refrigerant having passed through the adsorption heat exchanger 23, 25 functioning as the evaporator flows to the sensible heat exchanger 26 and is sucked by the compressor 21. Moreover, when the second four-way switching valve 27 is in the second state in the refrigerant circuit 20, the refrigerant flows from the compressor 21 to the sensible heat exchanger 26.

—Driving Operation—

Next, the driving operation of the humidity control apparatus 10 will be described. This humidity control apparatus 10 is constructed in such a way as to switch among a heating and humidifying operation, a cooling and humidifying operation, and a cooling and dehumidifying operation.

(Heating and Humidifying Operation)

Figure 5:
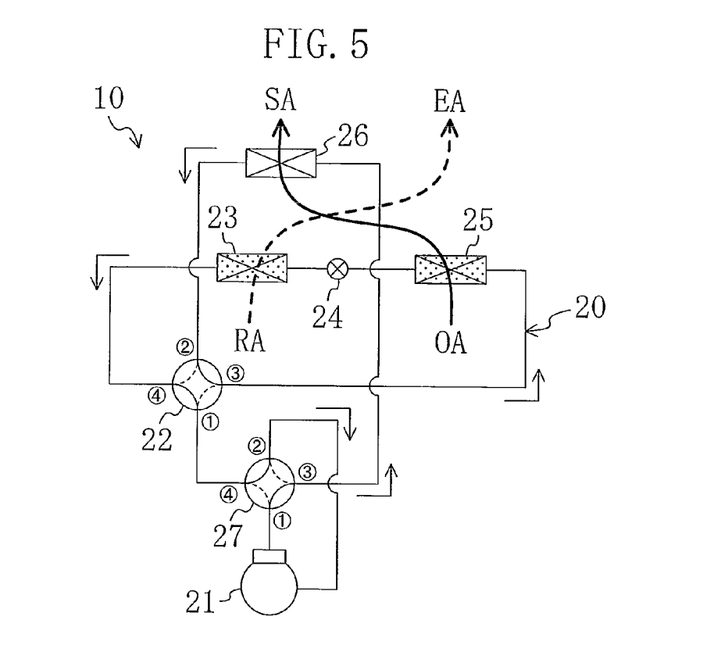
FIG. 5 is a piping system diagram to show the construction of a humidity control apparatus according to a second embodiment 2 and a first operation of a heating and humidifying operation of the apparatus.
Figure 6:
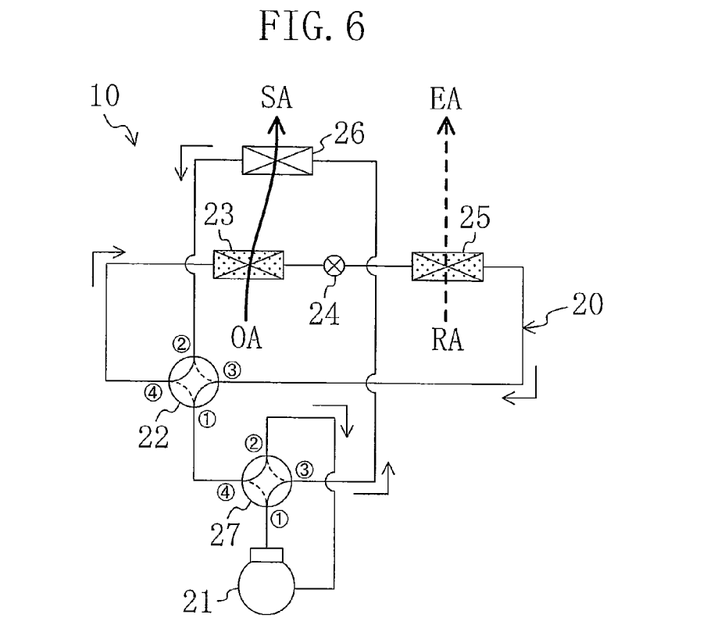
FIG. 6 is a piping system diagram to show the construction of the humidity control apparatus according to the second embodiment 2 and a second operation of the heating and humidifying operation of the apparatus.

This heating and humidifying operation is performed to a room warmed by another air conditioner, for example, in the winter. This operation is an operation in which a first operation and a second operation are alternately performed by switching the first four-way switching valve 22 to supply air humidified by the adsorption heat exchanger 23, 25 into the room, as shown in FIG. 5 and FIG. 6. In this heating and humidifying operation, the second four-way switching valve 27 is always set to the second state.

First, in the first operation, as shown in FIG. 5, the first four-way switching valve 22 is set to the first state, whereby the first adsorption heat exchanger 23 functions as an evaporator and the second adsorption heat exchanger 25 functions as a condenser. Here, the opening of the electric expansion valve 24 is suitably regulated. Moreover, in this first operation, an air passage is set in such a way that the outdoor air OA passes through the second adsorption heat exchanger 25 and the sensible heat exchanger 26 in order and is supplied into the room and that the room air RA passes through the first adsorption heat exchanger 23 and is discharged to the outside of the room. In other words, the outdoor air OA is taken in as air for regeneration and the room air RA is taken in as air for adsorption, respectively.

In this state, the refrigerant discharged from the compressor 21 flows to the sensible heat exchanger 26. In the sensible heat exchanger 26, the refrigerant radiates heat to the outdoor air OA, whereby the outdoor air OA is heated. The refrigerant discharged from the sensible heat exchanger 26 flows to the second adsorption heat exchanger 25, radiates heat, and condenses. By the heat radiation of the refrigerant, the adsorbent is regenerated in the second adsorption heat exchanger 25. In other words, moisture desorbed from the adsorbent is supplied to the outdoor air OA, whereby the outdoor air OA is humidified. Then, the outdoor air OA flows to the sensible heat exchanger 26 and is heated and then is supplied into the room, whereby the room is humidified.

The refrigerant having passed through the second adsorption heat exchanger 25 has pressure reduced by the electric expansion valve 24 and then flows to the first adsorption heat exchanger 23. In the first adsorption heat exchanger 23, the refrigerant adsorbs heat from the room air RA and evaporates, whereas the moisture of the room air RA is adsorbed by the adsorbent, whereby the room air RA is dehumidified. Then, the room air RA is discharged to the outside of the room. Then, the refrigerant having passed through the first adsorption heat exchanger 23 is again compressed and discharged by the compressor 21. This circulation of the refrigerant is repeatedly performed.

Next, the second operation will be described. When the first operation is performed for a specified time, the first four-way switching valve 22 is set to the second state, as shown in FIG. 6, whereby the first operation is switched to the second operation. In other words, the first adsorption heat exchanger 23 functions as a condenser and the second adsorption heat exchanger 25 functions as an evaporator. Moreover, in the second operation, an air passage is set in such a way that the outdoor air OA passes through the first adsorption heat exchanger 23 and the sensible heat exchanger 26 in order and is supplied into the room and that the room air RA passes through the second adsorption heat exchanger 25 and is discharged to the outside of the room.

In this state, the refrigerant discharged from the compressor 21 flows to the sensible heat exchanger 26 and radiates heat to the outdoor air OA, whereby the outdoor air OA is heated. The refrigerant discharged from the sensible heat exchanger 26 flows to the first adsorption heat exchanger 23, radiates heat, and condenses. By the heat radiation of the refrigerant, the adsorbent is regenerated in the first adsorption heat exchanger 23 and the outdoor air OA is humidified. Then, the outdoor air OA flows to the sensible heat exchanger 26 and is heated and then is supplied into the room, whereby the room is humidified.

The refrigerant having passed through the first adsorption heat exchanger 23 has pressure reduced by the electric expansion valve 24 and then flows to the second adsorption heat exchanger 25. In the second adsorption heat exchanger 25, the refrigerant adsorbs heat from the room air RA and evaporates, whereas the moisture of the room air RA is adsorbed by the adsorbent, whereby the room air RA is dehumidified. Then, the room air RA is discharged to the outside of the room. Then, the refrigerant having passed through the second adsorption heat exchanger 25 is again compressed and discharged by the compressor 21. This circulation of the refrigerant is repeatedly performed.

In this way, in the case of the heating and humidifying operation, the sensible heat exchanger 26 functions as a heating heat exchanger for heating air humidified by the adsorption heat exchanger 23, 25.

(Cooling and Humidifying Operation)

Figure 7:
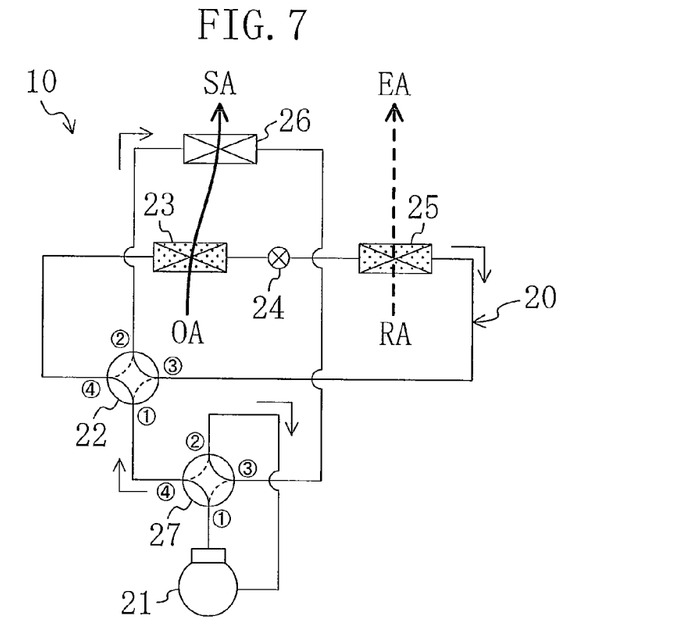
FIG. 7 is a piping system diagram to show the construction of the humidity control apparatus according to the second embodiment 2 and a first operation of a cooling and humidifying operation of the apparatus.
Figure 8:
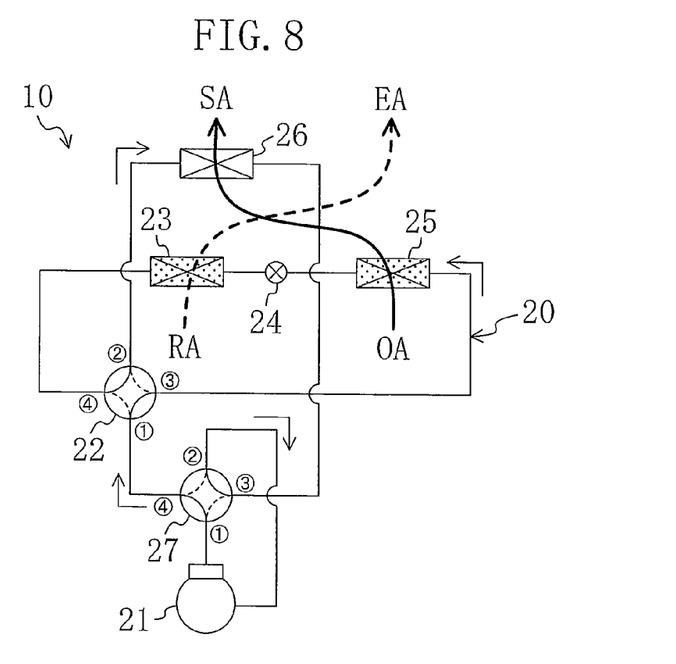
FIG. 8 is a piping system diagram to show the construction of the humidity control apparatus according to the second embodiment 2 and a second operation of the cooling and humidifying operation of the apparatus.

This cooling and humidifying operation corresponds to the cooling and humidifying operation of the above-mentioned embodiment 1 and is performed to a room cooled by another air conditioner, for example, in the winter. This operation is an operation in which a first operation and a second operation are alternately performed by switching the first four-way switching valve 22 to supply air humidified by the adsorption heat exchanger 23, 25 into the room, as shown in FIG. 7 and FIG. 8. In this heating and humidifying operation, the second four-way switching valve 27 is always set to the first state.

First, in the first operation, as shown in FIG. 7, the first four-way switching valve 22 is set to the first state, whereby the first adsorption heat exchanger 23 functions as a condenser and the second adsorption heat exchanger 25 functions as an evaporator. Here, the opening of the electric expansion valve 24 is suitably regulated. Moreover, in this first operation, an air passage is set in such a way that the outdoor air OA passes through the first adsorption heat exchanger 23 and the sensible heat exchanger 26 in order and is supplied into the room and that the room air RA passes through the second adsorption heat exchanger 25 and is discharged to the outside of the room. In other words, the outdoor air OA is taken in as air for regeneration and the room air RA is taken in as air for adsorption, respectively.

In this state, the refrigerant discharged from the compressor 21 flows to the first adsorption heat exchanger 23, radiates heat and condenses. In this way, in the first adsorption heat exchanger 23, the adsorbent is regenerated and the outdoor air OA is humidified. Then, the outdoor air OA flows to the sensible heat exchanger 26. The refrigerant having passed through the first adsorption heat exchanger 23 has pressure reduced by the electric expansion valve 24 and then flows to the second adsorption heat exchanger 25 and evaporates. Moreover, in the second adsorption heat exchanger 25, the room air RA is dehumidified and then is discharged to the outside of the room. Then, the refrigerant having passed through the second adsorption heat exchanger 25 flows to the sensible heat exchanger 26. In the sensible heat exchanger 26, the refrigerant adsorbs heat from the outdoor air OA after having passed through the first adsorption heat exchanger 23, thereby being superheated. In this manner, the outdoor air OA is cooled and then is supplied into the room. On the other hand, the refrigerant discharged from the sensible heat exchanger 26 is again compressed and discharged by the compressor 21. This circulation of the refrigerant is repeatedly performed.

Next, the second operation will be described. When the first operation is performed for a specified time, the first four-way switching valve 22 is set to the second state, whereby the first operation is switched to the second operation, as shown in FIG. 8. In the second operation, an air passage is set in such a way that the outdoor air OA passes through the second adsorption heat exchanger 25 and the sensible heat exchanger 26 in order and is supplied into the room and that the room air RA passes through the first adsorption heat exchanger 23 and is discharged to the outside of the room.

In this state, the refrigerant discharged from the compressor 21 flows to the second adsorption heat exchanger 25 and radiates heat and condenses. By the heat radiation of the refrigerant, the adsorbent is regenerated in the second adsorption heat exchanger 25 and moisture desorbed from the adsorbent is supplied to the outdoor air OA, whereby the outdoor air OA is humidified. Then, the outdoor air OA flows to the sensible heat exchanger 26.

The refrigerant having passed through the second adsorption heat exchanger 25 has pressure reduced by the electric expansion valve 24 and then flows to the first adsorption heat exchanger 23 and evaporates. Moreover, in the first adsorption heat exchanger 23, the room air RA is dehumidified and then is discharged to the outside of the room. Then, the refrigerant having passed through the first adsorption heat exchanger 23 flows to the sensible heat exchanger 26. In the sensible heat exchanger 26, the refrigerant adsorbs heat from the outdoor air OA after having passed through the second adsorption heat exchanger 25, thereby being superheated. In this manner, the outdoor air OA is cooled and then is supplied into the room. On the other hand, the refrigerant superheated by the sensible heat exchanger 26 is again compressed and discharged by the compressor 21. This circulation of the refrigerant is repeatedly performed.

In this regard, as in the case of the embodiment 1, in the present embodiment 2, the humidity control apparatus 10 is constructed in such a way that the cooling temperature of the outdoor air OA becomes the dew point temperature of the air or higher, that is, not lower than the dew point temperature of the air in the sensible heat exchanger 26.

In this manner, in the case of the cooling and humidifying operation, the sensible heat exchanger 26 functions as a cooling heat exchanger for cooling air humidified by the adsorption heat exchanger 23, 25. In the present embodiment, the second four-way switching valve 27 is a valve for switching the sensible heat exchanger 26 between a state in which the sensible heat exchanger 26 is made to function as a heating heat exchanger and a state in which the sensible heat exchanger 26 is made to function as a cooling heat exchanger. In other words, the second four-way switching valve 27 constructs a passage switching member for switching a refrigerant passage in such a way that the sensible heat exchanger 26 switches between a state, in which the refrigerant having passed through the adsorption heat exchanger 23, 25 functioning as the evaporator adsorbs heat from the air having passed through the adsorption heat exchanger 23, 25 functioning as the condenser, and a state, in which the refrigerant discharged from the compressor 21 radiates heat to the air having passed through the adsorption heat exchanger 23, 25 functioning as the condenser.

(Cooling and Dehumidifying Operation)

This cooling and dehumidifying operation, although not shown in the drawing, is different in the passages of the outdoor air OA and the room air RA from the above-mentioned cooling and humidifying operation. In other words, in this cooling and dehumidifying operation, the outdoor air OA dehumidified by the adsorption heat exchanger 23, 25 is cooled by the sensible heat exchanger 26 and is supplied into the room and the room air RA humidified by the adsorption heat exchanger 23, 25 is discharged to the outside of the room, which is different from the cooling and humidifying operation.

Specifically, in the first operation, the air passage is set in such a way that the outdoor air OA passes through the second adsorption heat exchanger 25 and the sensible heat exchanger 26 in order and is supplied into the room and that the room air RA passes through the first adsorption heat exchanger 23 and is discharged to the outside of the room. In other words, the outdoor air OA is taken in as air for adsorption and the room air RA is taken in as air for regeneration, respectively. Moreover, in the second operation, the air passage is set in such a way that the outdoor air OA passes through the first adsorption heat exchanger 23 and the sensible heat exchanger 26 in order and is supplied into the room and that the room air RA passes through the second adsorption heat exchanger 25 and is discharged to the outside of the room.

—Advantages of the Embodiment 2—

According to the present embodiment 2, the refrigerant circuit 20 is provided with the second four-way switching valve 27. Thus, it is possible to switch the sensible heat exchanger 26 between a state in which the sensible heat exchanger 26 is made to function as a heating heat exchanger and a state in which the sensible heat exchanger 26 is made to function as a cooling heat exchanger. This makes it possible to switch between a heating and humidifying operation for heating humidified air and supplying the air into the room and a cooling and humidifying operation for cooling the humidified air and supplying the air into the room.

For this reason, when the heating and humidifying operation is performed in the winter in the room warmed by another air conditioner, the heating load of the air conditioner can be reduced. Moreover, when the cooling and humidifying operation is performed in the winter in the room cooled by another air conditioner, the cooling load of the air conditioner can be reduced. As a result, it is possible to reduce the consumption energy of the air conditioner and at the same time to humidify the room.

The other constructions, operations, and advantages of the present embodiment 2 are the same as those of the above-mentioned embodiment 1.

INDUSTRIAL APPLICABILITY

As described above, the present invention is useful for a humidity control apparatus for humidifying air by the use of an adsorption heat exchanger having an adsorbent of moisture supported thereon.

DESCRIPTION OF REFERENCE CHARACTERS

10 Humidity Control Apparatus
20 Refrigerant Circuit
21 Compressor

23 First Adsorption Heat Exchanger
25 Second Adsorption Heat Exchanger
26 Sensible Heat Exchanger
27 Second Four-way Switching Valve (Passage Switching Member)

The invention claimed is:

1. A humidity control apparatus that comprises a refrigerant circuit including a compressor, and a first adsorption heat exchanger and a second adsorption heat exchanger, each of which has an adsorbent for adsorbing moisture of air supported thereon, and circulating refrigerant to perform a vapor compression refrigerant cycle, wherein the refrigerant circuit further includes
a four-way switching valve configured to switch between a first operation and a second operation, where in the first operation, refrigerant discharged from the compressor condenses in the first adsorption heat exchanger and refrigerant evaporated in the second adsorption heat exchanger is sucked into the compressor, and in the second operation, the refrigerant discharged from the compressor condenses in the second adsorption heat exchanger and refrigerant evaporated in the first adsorption heat exchanger is sucked into the compressor, and
a sensible heat exchanger, where in the first operation, the sensible heat exchanger is located downstream of the second adsorption heat exchanger to be supplied with gas single phase refrigerant flowing out of the second adsorption heat exchanger, whereas in the second operation, the sensible heat exchanger is located downstream of the first adsorption heat exchanger to be supplied with gas single phase refrigerant flowing out of the first adsorption heat exchanger, and
the refrigerant circuit is configured to perform cooling and humidifying operation in which the first operation and the second operation are alternately repeated such that in the first operation, air humidified in the first adsorption heat exchanger and then cooled in the sensible heat exchanger is supplied into a room, and in the second operation, air humidified in the second adsorption heat exchanger and then cooled in the sensible heat exchanger is supplied into the room.

2. The humidity control apparatus of claim 1, wherein the refrigerant circuit is constructed such that a cooling temperature of the air by the sensible heat exchanger becomes a dew point temperature of the air or higher.

3. The humidity control apparatus of claim 1 or claim 2, wherein
the refrigerant circuit includes a passage switching member for switching a refrigerant passage between a state where the sensible heat exchanger is located downstream of the second adsorption heat exchanger in the first operation and the sensible heat exchanger is located downstream of the first adsorption heat exchanger in the second operation and a state where the sensible heat exchanger is located upstream of the first adsorption heat exchanger in the first operation and the sensible heat exchanger is located upstream of the second adsorption heat exchanger in the second operation.

4. The humidity control apparatus of claim 1, wherein
a cooling and humidifying operation is performed in which air cooled in the sensible heat exchanger after being humidified in the adsorption heat exchanger in which a regeneration operation of the adsorbent is performed is supplied to the room.

5. A humidity control apparatus that comprises a refrigerant circuit including a compressor, and a first adsorption heat exchanger and a second adsorption heat exchanger, each of which has an adsorbent for adsorbing moisture of air supported thereon, and circulating refrigerant to perform a vapor compression refrigerant cycle, wherein the refrigerant circuit further includes
a four-way switching valve configured to switch between a first operation and a second operation, where in the first operation, refrigerant discharged from the compressor condenses in the first adsorption heat exchanger and refrigerant evaporated in the second adsorption heat exchanger is sucked into the compressor, and in the second operation, the refrigerant discharged from the compressor condenses in the second adsorption heat exchanger and refrigerant evaporated in the first adsorption heat exchanger is sucked into the compressor, and
a sensible heat exchanger, where in the first operation, the sensible heat exchanger is located downstream of the second adsorption heat exchanger to be supplied with gas single phase refrigerant flowing out of the second adsorption heat exchanger, whereas in the second operation, the sensible heat exchanger is located downstream of the first adsorption heat exchanger to be supplied with gas single phase refrigerant flowing out of the first adsorption heat exchanger,
the refrigerant circuit is configured to perform cooling and humidifying operation in which the first operation and the second operation are alternately repeated such that in the first operation, air humidified in the first adsorption heat exchanger and then cooled in the sensible heat exchanger is supplied into a room, and in the second operation, air humidified in the second adsorption heat exchanger and then cooled in the sensible heat exchanger is supplied into the room, and
heat exchangers provided in the refrigerant circuit to exchange heat between the refrigerant and the air are only the single first adsorption heat exchanger, the single second adsorption heat exchanger, and the single sensible heat exchanger.

* * * * *